Dec. 22, 1964  R. R. TALLAKSEN  3,162,113
ADJUSTABLE GRILL UNIT
Filed Nov. 13, 1963  2 Sheets-Sheet 1
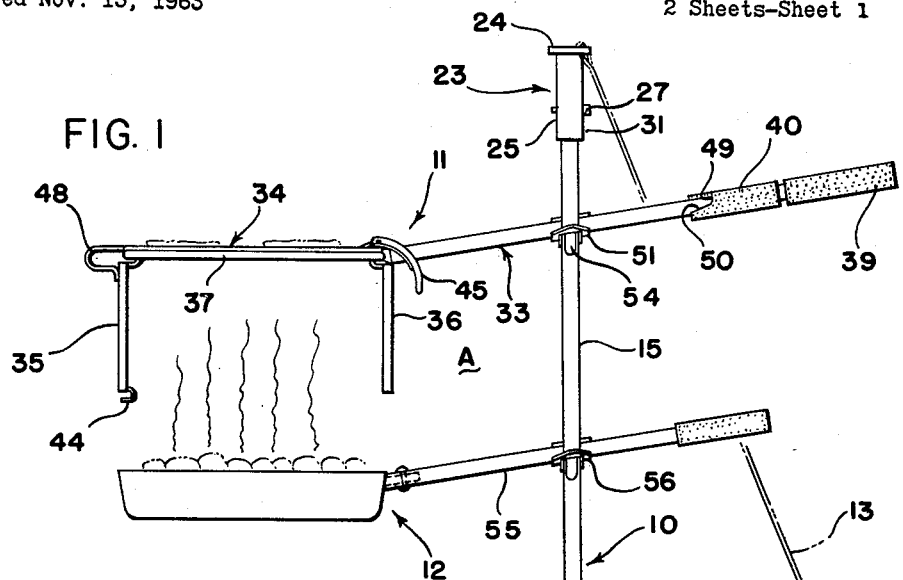
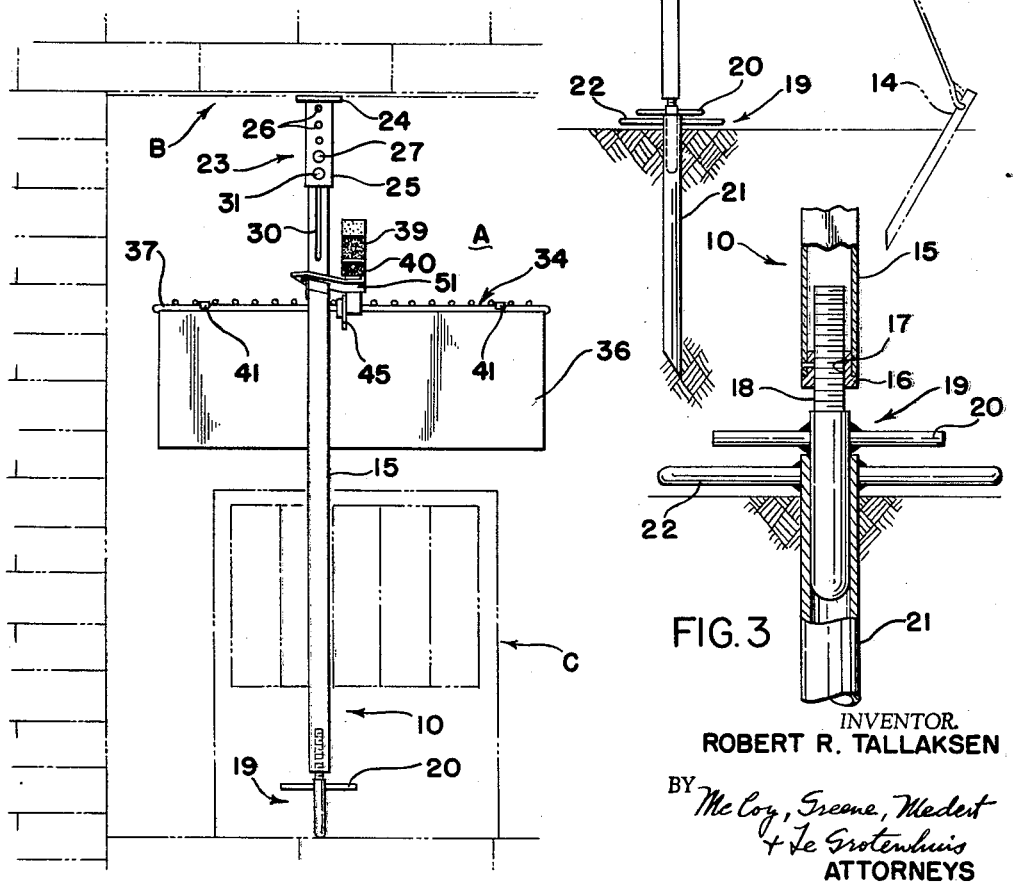
INVENTOR.
ROBERT R. TALLAKSEN
BY McCoy, Greene, Medert
+ te Grotenhuis
ATTORNEYS Dec. 22, 1964
R. R. TALLAKSEN
3,162,113
ADJUSTABLE GRILL UNIT
Filed Nov. 13, 1963
2 Sheets-Sheet 2
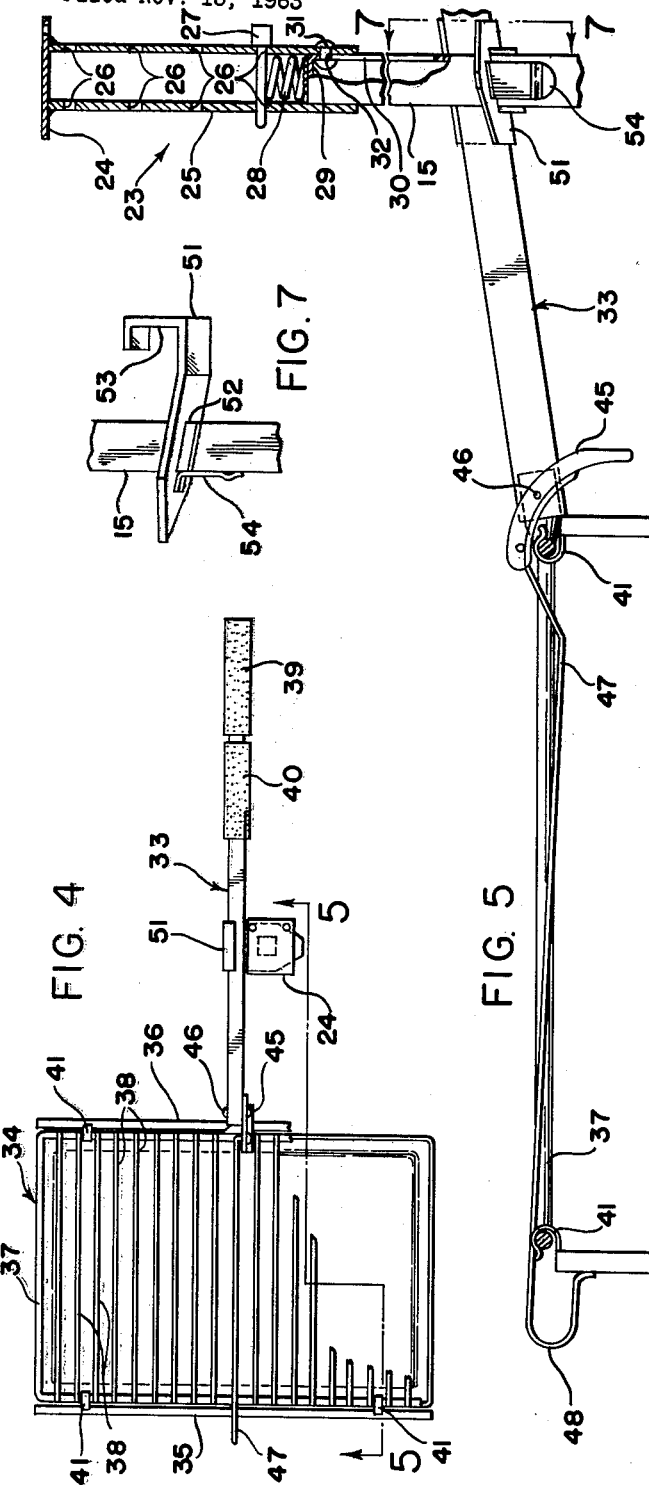
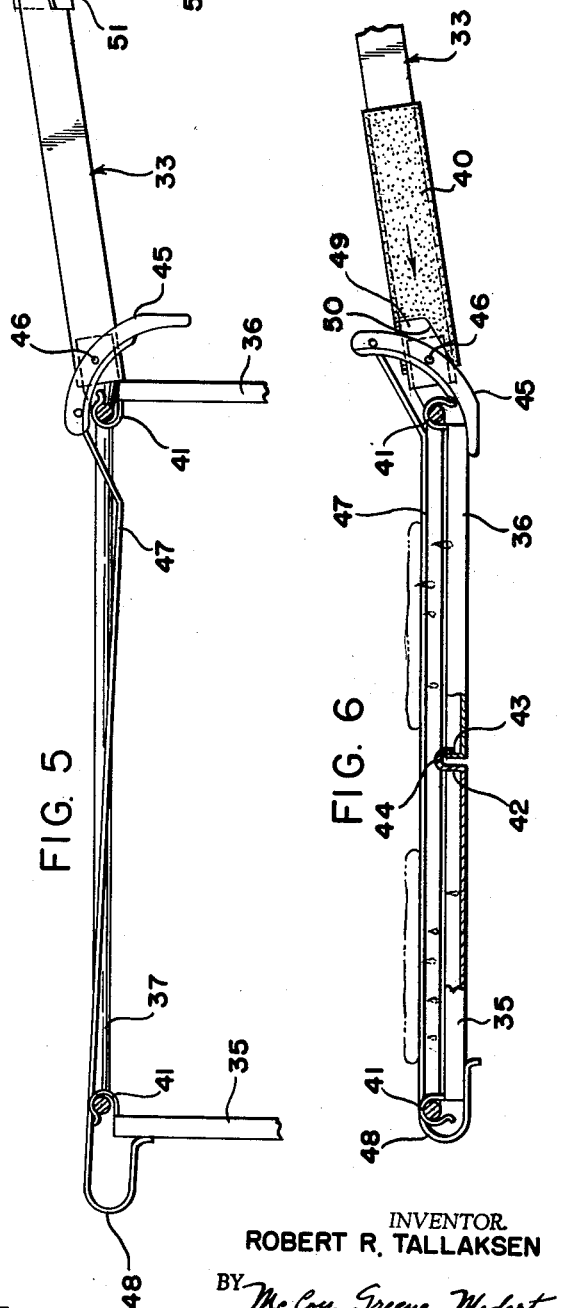
INVENTOR.
ROBERT R. TALLAKSEN
BY McCoy, Greene, Medert
 & Le Grotenhuis
ATTORNEYS

United States Patent Office 3,162,113
Patented Dec. 22, 1964

3,162,113
ADJUSTABLE GRILL UNIT
Robert R. Tallaksen, 4025 Lassiter Mill Road,
Raleigh, N.C.
Filed Nov. 13, 1963, Ser. No. 323,289
2 Claims. (Cl. 99—446)

The present invention relates to an adjustable grill unit for broiling meats and other foods and more particularly to a grill unit which may be mounted in an indoor fireplace if desired and also at any outdoor location.

In grill units for broiling meats and other foods, which are adaptable for mounting indoors and particularly in a fireplace it is desirable to provide a grill of simple low cost construction which is adaptable for mounting in fireplace openings of many different sizes. Grills having a mounting member in the form of a vertical post adapted to fit tightly in a fireplace opening have generally proved unsatisfactory due to the tendency of the materials used for fireplace construction to expand and contract in response to changes in temperature. Thus, even though a vertical mounting post might be tightly fitted in a fireplace opening when the fireplace materials are expanded due to high temperatures from the cooking fire, when the fire dies out the temperature drop will eventually cause the fireplace materials to contract and the mounting post will become loose and tend to fall.

Another problem encountered in broiling meats and other foods over an open fire, particularly in the home, is the danger of dripping grease and juices from the meat and from the surfaces of the grill when removing the grill from the cooking fire. Hot grease drippings falling on carpets and wooden floors present a fire hazard and cause unsightly spots which are difficult to remove.

The grill unit of the present invention provides a means for mounting a grill on a vertical post in a fireplace opening wherein the post is under axial spring compression and will remain tightly fitted in the opening even when the materials in the fireplace expand and contract under the influence of changing temperatures. The invention also provides a unique and novel arrangement for covering the bottom surface of the grill when the meat or other food has been broiled thereon to catch grease drippings while the meat is being carried on the grill to the serving area.

The grill unit of the type embodiment in the present invention uses swingable grease catching pans which are hinged at the forward and rearward sides of a rectangular grill and which normally hang vertically downward from the grill while the meat is cooking to provide a reflecting surface which directs more heat to the broiling surface. The pans may easily be swung upward to a horizontal grease catching position beneath the grill to prevent grease and meat juices from dripping from the meat when it is desired to remove the grill from the cooking fire. The pans are brought upward to their horizontal position by means of a cam arrangement which is actuated by a slidable sleeve on the grill handle. Once the pans are in their horizontal grease catching position, they are locked in place until positively released.

The grill unit may also be mounted outdoors in any desired location merely by placing the bottom end of the mounting post in a hollow pipe which has been driven into the ground. It may be desirable in some instances to fasten a diagonal tension wire to the top of the post to provide additional support.

The grill has an extending handle which is mounted on the vertical post by means of an adjustable bracket. A charcoal pan may also be mounted on the post in a similar manner if desired or a cooking fire may be otherwise located below the grill.

It is an object of the present invention to provide a simple efficient grill unit for broiling meat and other foods which includes means for catching grease drippings from the bottom surface of the grill when it is desired to transport the meat on the grill ot a serving area.

It is another object of the present invention to provide a broiling grill unit of simple low cost construction which may be readily mounted in a fireplace opening and which includes means to compensate for expansion and contraction of the materials used in the construction of the fireplace so that the grill unit will remain tightly mounted in the opening under varying temperature conditions.

Other objects, uses and advantages of this invention will become apparent from the following description as illustrated in the accompanying drawings in which the arts are designated by the numerals of reference throughout the several views. In the drawings:

FIGURE 1 is a side elevation of a boiling grill unit embodying the present invention, showing the grill unit mounted outdoors in the open.

FIGURE 2 is an end elevation of a grill unit embodying the present invention showing the grill unit mounted in a fireplace opening.

FIGURE 3 is a fragmentary transverse sectional view showing the tightening stud of the vertical post inserted in a hollow pipe which has been driven into the ground.

FIGURE 4 is a top elevation of the grill unit shown in FIGURES 1 and 2.

FIGURES 5 is a fragmentary sectional view taken along the line 5—5 of FIGURE 4 and showing the grease catching pans in their free-hanging vertical position.

FIGURE 6 is a fragmentary sectional view taken along the lines 5—5 of FIGURE 4 and showing the grease catching pans in their horizontal grease catching position.

FIGURE 7 is a fragmentary sectional view taken along the lines 7—7 of FIGURE 5 and showing the mounting bracket with the grill handle removed.

Referring more particularly to the drawings there is shown an adjustable grill unit A for broiling meats and other foods which generally comprises a vertical mounting post 10, a grill member 11 and a charcoal pan 12. The vertical mounting post 10 may be mounted outdoors in the open as shown in FIGURE 1 or indoors in a fireplace opening B as shown in FIGURE 2. When the unit A is mounted in the open, it may be desirable to attach a diagonal tension line 13 to the top of the post 10 to counteract the twisting force at the base of the post 10 caused by the weight of the grill member 11 and the charcoal pan 12. The tension line 13 may be secured by a stake 14 driven into the ground as shown in FIGURE 1. When the grill is mounted in an indoor fireplace opening B it may be desirable to remove the charcoal pan 12 and use some other bed for the cooking fire such as a wood or charcoal fire box C as shown in FIGURE 2.

The vertical post 10 includes a column 15 which is preferably tubular in form and of rectangular cross section. Mounted at the base of the column 15 is a plug 16 which is tightly fitted in the end thereof and which has a threaded opening 17 which receives a threaded shank 18 of a tightening stud 19 as best shown in FIGURE 3. A handle 20 in the form of a transverse rod is provided on the tightening stud 19 to facilitate turning the stud to tighten the vertical post 10 in position when the grill unit A is mounted in a fireplace opening B. When the grill unit A is mounted outdoors in the open, the tightening stud 19 may be placed in a hollow pipe 21 driven into the ground to provide a sturdy mount as shown in FIGURE 1. The pipe 21 is provided with a handle 22 to facilitate forcing the pipe into the ground.

Mounted at the top of the column 15 is a post adjuster 23 adapted to engage the ceiling of a fireplace opening as shown in FIGURE 2. The post adjuster is best shown FIGURE 5 and includes a bearing plate 24 at its top a tubular sleeve portion 25. The sleeve portion has [a pl]urality of circular openings arranged on opposite sides [ther]eof in pairs 26, each pair 26 being axially aligned and [be]ing adapted to receive an adjusting pin 27 which may [be] passed transversely through the sleeve portion 25 as [sho]wn in FIGURE 5.

[T]he pin 27 bears against a coil spring 28 which is [mo]unted on a floor portion 29 extending across the top [of t]he column 15. The pin 27 may be placed in any of [the] pairs of openings 26 passing through the tubular [slee]ve portion 25 in order to adjust the length of the [mo]unting post 10 to different heights of fireplace openings. [W]hen the mounting post 10 is to be positioned in a [fire]place opening B the post adjuster 23 is first positioned [to] provide the desired length for the post 10 using the [adj]usting pin 27. The length of the post 10 should [pre]ferably be slightly greater than the height of the [fire]place opening B so that the post adjuster 23 keeps the [spri]ng 28 under some compression while the post is in [the] opening B. The post 10 may be further tightened [in t]he fireplace opening B by turning the handle 20 of [the] tightening stud 19 and thus forcing the column 15 [furt]her upward against the force of the coil spring 28.

[A]t the upper end of the column 15 is a vertical slot 30 [loc]ated on one side of the column 15 and adapted to slid[abl]y receive a rivet 31 mounted in a circular opening 32 [nea]r the bottom of the tubular sleeve portion 25 of the [pos]t adjuster 23. The rivet extends through the wall of [the] tubular sleeve portion and through the vertical slot [30] as shown in FIGURE 7 to slidably lock the post ad[just]er 23 to the column 15.

[T]he grill member 11 which is adapted for mounting on [the] vertical post 10 as will be hereinafter described, gen[era]lly comprises a handle 33, a grill 34 and hinged grease [catc]hing pans 35 and 36. The grill 34 includes a rec[tan]gular frame 37 preferably formed of metallic rod, and [a p]lurality of spaced transverse rods 38.

[T]he handle 33 is attached to the frame 37 and is prefer[abl]y tubular in form and of rectangular cross section. [Loc]ated at the end of the handle 33 opposite the grill 34 [is a]n insulating hand grip 39 formed of a material having [lo]w heat conductivity. Also mounted on the handle 33 [is a] slidable sleeve 40 which is used to operate the grease [catc]hing pans 35 and 36 in the manner to be hereinafter [des]cribed. The sleeve 40 is also formed of a suitable [insu]lating material so that it may be gripped by the hand [and] slid back and forth on the handle 33.

[T]he grease catching pans 35 and 36 are connected on [opp]osite sides of the rectangular frame 37 by hinges 41 [wh]ich are formed of metal straps and have a hook shaped [cro]ss section as best shown in FIGURES 5 and 6. The [pan]s 35 and 36 are of rectangular form and have periph[era]l walls 42 and 43 which form shallow grease catching [bas]ins when the pans 35 and 36 are positioned in hori[zon]tal relation beneath the grill 34.

[T]he pans 35 and 36 are of a proper size to extend [acr]oss the entire surface area beneath the grill 34 when [pos]itioned adjacent one another in horizontal relation[shi]p as shown in FIGURE 6. The hinges 41 are easily [det]ached from the grill frame 37 to permit the pans to [be] removed for cleaning.

[T]he pans 35 and 36 have a free-hanging vertical posi[tio]n as shown in FIGURE 5 wherein they provide re[flec]ting surfaces which direct heat radiated by the cooking [fire] upward toward the meat or other food being broiled [on] the grill 34. When desired, the pans 35 and 36 may [be] pivoted upwardly to a horizontal grease catching posi[tio]n as shown in FIGURE 6 wherein the pans receive [and] retain grease drippings from the grill 34. The pan [35] has an outwardly extending curved coupling flange 44 [alo]ng the wall portion opposite its hinges 41 which provides [for] the coupling of the pans when in horizontal grease [cat]ching position and which covers the space between the [pan]s 35 and 36.

The pans 35 and 36 are operated by a camming arrangement which is operated by the slidable sleeve 40. The sleeve 40 engages a cam member 45 pivotally mounted on the handle 33 by a pin 46 passing through the cam member 45 and the handle 33. Pivotally attached to the upper end of the cam member 45 is a pan operating rod 47 which extends from the cam member 45 across the grill 34 and which has a hook shaped end portion 48 adapted to engage the pan 35. The sleeve 40 has a notched portion 49 at one side as shown in FIGURE 6 which forms a cam engaging surface 50. When the sleeve 40 is slid downward on the handle towards the grill 34, the cam engaging surface 50 engages the cam member 45 below the pin 46 and pivots the cam member 45 in a clockwise direction. This causes the upper portion of the cam member 45 to pull the pan operating rod 47 toward the handle 33 and the hooked portion 48 presses against the bottom of the pan 35 and swings it upward into its horizontal grease-catching position adjacent the pan 35 as shown in FIGURE 6. The pan 35 reaches its horizontal position before the pan 36 so that the wall 43 of the pan 36 will swing into position beneath the coupling flange 44 of the pan 35.

The pans 35 and 36 will then be positively locked in their horizontal position by the hook portion 48 of the pan operating rod 47 as shown in FIGURE 6. The pans 35 and 36 may be released merely by applying pressure with the thumb to the top of the cam member 45 to slide the pan-operating rod 47 outwardly to release the pan 35 so it will swing downward to its vertical free-hanging position.

The grill member 11 is mounted on the vertical post 10 by means of a bracket 51 which is best shown in FIGURE 7. The bracket has a rectangular opening 52 adapted to receive the column 15 and has an L-shaped end portion which forms a channel 53 of a suitable size to receive the handle 33. A spring blade 54 extends downwardly from the bracket 51 and is adapted to engage the column 15 and to bias the bracket 51 into a binding engagement with the column 15 and increase the frictional force tending to prevent sliding of the bracket 51 relative to the column 15.

The handle 33 of the grill member 11 may be easily positioned in the channel 53 for convenient mounting on the post 10. The weight of the grill member effects a twisting force or torque on the bracket 51 relative to the column 15 and thus increases the frictional force tending to prevent sliding of the bracket 51 on the column 15 and holds the grill member 11 firmly in position relative to the post 10. The horizontal position of the grill member 11 relative to the post 10 may be adjusted merely by lifting the handle 33 slightly and sliding it in the bracket 51 until the grill 34 is in the desired position.

When it is desired to vary the height of the grill 34, the handle 33 may be twisted slightly counterclockwise to counteract the twisting force applied by the bracket 51 against the column 15 and the bracket 51 and grill member 11 may be slid up or down on the column 15 to any desired position.

A charcoal pan 12 mounted on a handle 55 may be mounted beneath the grill 34 in another bracket 56 identical to the bracket 51 as shown in FIGURE 1. The vertical position of the charcoal pan 12 may also be adjusted in the same manner as the grill member merely by applying a slight twist to the handle 55 and sliding the bracket 56 to the desired position on the column 15.

It will be understood that the above description is by way of illustration rather than limitation and that, in accordance with the provisions of the patent laws, variations and modifications of the specific device herein shown and described may be made without departing from the spirit of the invention.

Having described my invention, I claim:

1. A portable grill for supporting meats and other foods for broiling comprising a handle, a rectangular grill portion attached to said handle, two grease catching pans hinged to opposite edge portions of said grill portion and swingable from a free hanging vertical position to a horizontal grease catching position beneath said grill portion, a cam pivotally mounted on said handle and having a lower portion engageable with one of said pans and an upper portion, means movable with the upper portion of said cam for swinging the other of said pans from its free hanging position to its grease catching position in response to pivoting of said cam and means for pivoting said cam whereby the lower portion of said cam swings one of said pans to its grease catching position and the upper portion of said cam swings the other of said pans to its grease catching position.

2. A portable grill as defined in claim 1 wherein said means for pivoting said cam comprises a sleeve slidably mounted on said handle and engageable with the lower portion of said cam whereby sliding movement of said sleeve toward said cam pivots said cam to swing said pans to their grease catching position.

References Cited by the Examiner
UNITED STATES PATENTS

| | | | |
|---|---|---|---|
| 195,087 | 9/77 | Brock | 99—402 |
| 1,201,704 | 10/16 | Davite | 99—402 X |
| 2,123,329 | 7/38 | Combs et al. | |
| 2,523,200 | 9/50 | Durst. | |
| 2,629,315 | 2/53 | Schaar | 99—446 |
| 2,698,726 | 1/55 | Howe. | |

FOREIGN PATENTS 668,361  3/52  Great Britain.

ROBERT E. PULFREY, *Primary Examiner.*

JEROME SCHNALL, *Examiner.*